H. A. Chadwick.
Water Wheel.
Nº 98,665. Patented Jan. 11, 1870.
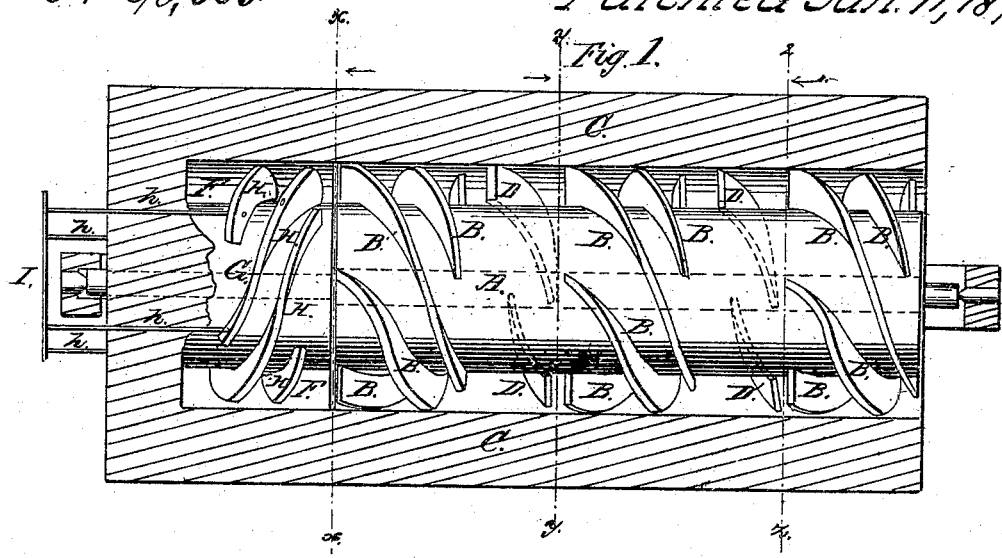
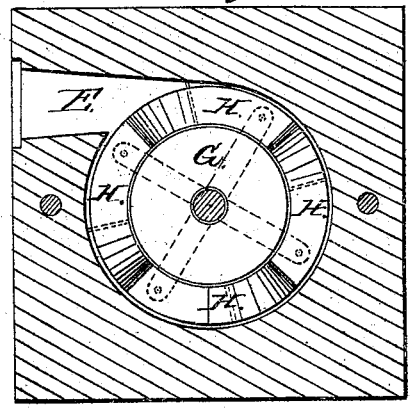
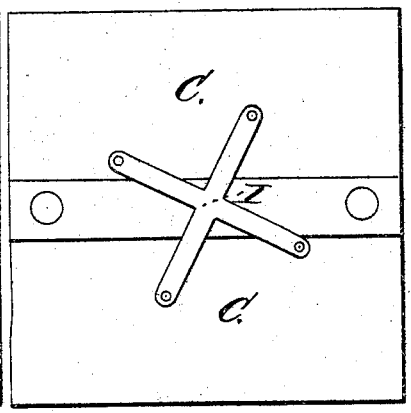
Witnesses.
Inventor.
H. A. Chadwick
by Crundle & Dyer
Attys.

Sheet 2, 2 Sheets.

H. A. Chadwick
Water Wheel

Nº 98,665.  Patented Jan. 11, 1870.

Witnesses

Inventor:
H. A. Chadwick
by Prindle & Dyer
Att'ys.

United States Patent Office.

H. A. CHADWICK, OF BURNET, TEXAS.

Letters Patent No. 98,665, dated January 11, 1870; antedated December 29, 1869.

---

IMPROVEMENT IN TURBINE WATER-WHEELS.

---

The Schedule referred to in these Letters Patent and making part of the same.

---

*To all whom it may concern:*

Be it known that I, H. A. CHADWICK, of Burnet, in the county of Burnet, and in the State of Texas, have invented certain new and useful Improvements in Turbine Water-Wheels; and do hereby declare that the following is a full, clear, and exact description thereof, reference being had to the accompanying drawing, making a part of this specification, in which—

Figure 1 is a side elevation of my improved wheel, with the front of the cylinder or casing removed;

Figure 2 is a cross-section of the same, on the line $x\ x$ of fig. 1, showing the scroll-valves;

Figure 3 is a top view of the casing;

Letters of like name and kind refer to like parts in each of the figures.

Figure 4:
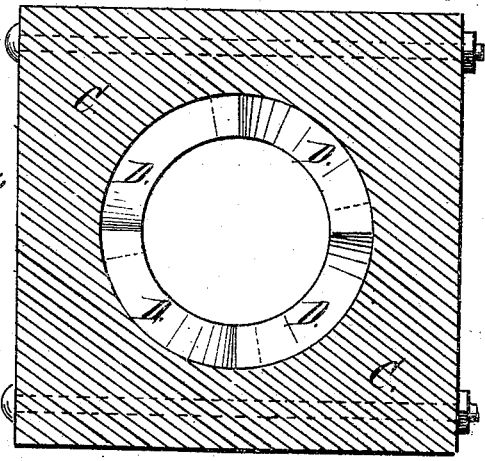
Figure 4 is a cross-section of the casing, on the line $y\ y$ of fig. 1.
Figure 5:
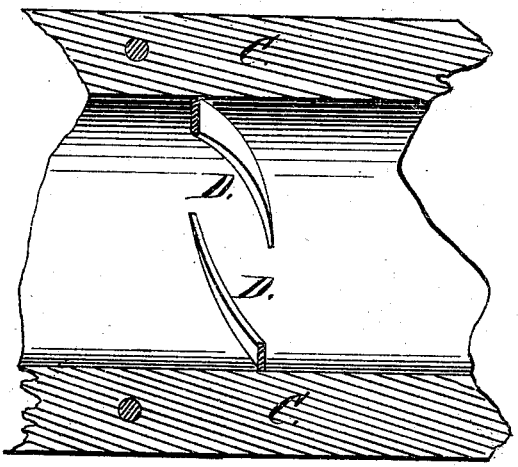
Figure 5 is a broken longitudinal section of said casing.
Figure 6:
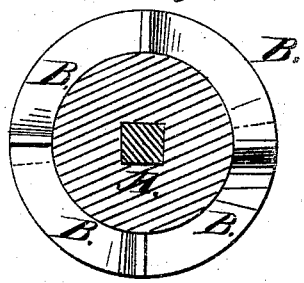
Figure 6 is a cross-section of the wheel, on the line $z\ z$ of fig. 1.

In turbine water-wheels as at present constructed, the water issues with more or less force from the flume, showing conclusively that all of its power has not been given to the wheel, and that, consequently, there is both a waste of water and loss of power.

To obviate these objections, and fully economize all the power of the water, is the object of my invention, which consist in the employment of direct and reaction spiral buckets, arranged upon the wheel in alternate sets, with suitable guides for reversing the current of water, secured to the trunk or casing between each set, whereby said current, upon leaving each set of buckets, is reversed and caused to strike directly against those of the next set below, until its force is entirely expended, and it leaves the exit-pipe in a "dead" or expended state.

It also consists in the peculiar construction and arrangement of the valves controlling the inlet-pipe, whereby the entering current of water is directed so as to strike the buckets of the wheel at the same angle, whatever the quantity of water admitted.

In the annexed drawing—

A represents the wheel, having secured upon its periphery three sets of spiral buckets, B B, &c., the faces of which are at a right angle to the line of said wheel. The inclination or pitch of the buckets is not the same during their entire length, it being quite sharp at the upper end, and for a short distance downward, and from thence to the lower end less rapid, producing what is known as direct and reaction buckets.

The wheel is suitably journaled at either end, so as to revolve freely, and is surrounded by a cylinder or casing, C, the internal diameter of which corresponds with the external diameter of said wheel over the buckets.

Secured radially upon the inside of the casing, between each set of buckets, is a number of guides, D D, in the form of a short section of a spiral thread, which corresponds in breadth and thickness with the buckets, and nearly fills the space between said casing and the wheel.

These guides are so placed as to incline in the opposite direction from the buckets, and are for the purpose of reversing the current of water from the buckets immediately above, so as to cause it to strike the buckets below at a right angle, or in the same manner as when entering the casing.

When thus constructed and arranged, if the water be allowed to enter the upper end of the casing, so as to strike the upper ends of the buckets at a right angle, its direct force will be communicated to the wheel, after which the downward flow of said water will operate upon the balance of said buckets, and by reaction communicate an additional percentage of its power to said wheel.

Upon issuing from the first set of buckets, the water has a considerable velocity, but the current has been reversed, so that if allowed to strike the second set of buckets, its direct force would be lost, and it would act thereon only by reaction. The guides, however, receive the water as it leaves the buckets, and reverse its course, so as to cause it to strike the next set at the same angle as it did the first, by which means its action is the same, although in a diminished degree. The same action and result are produced be each additional set of guides and buckets until the force or velocity of the water is entirely expended.

It has been found that by the addition of one set of guides and buckets, fifty per cent. more power was obtained than by the single set, and that when another, or a second set of each was added, a further increase of twenty-five per cent. of power was gained, after which the water left the exit-pipe or flume in a dead or exhausted state.

Immediately above the wheel A is placed the inlet-pipe, E, opening into an annular chamber, F, corresponding in diameter with the bore of the casing, and having an inner wall, G, corresponding in diameter and shape with the wheel.

A number of sections of a spiral, H H, &c., is pivoted at their centre upon the periphery of the wall G, at equidistant points, the forward end of each overlapping the section immediately in its front. When thus arranged, the sections or valves are allowed to vibrate upon the pivot, so as to permit them to be closed down upon each other and check the flow of water, or placed in the position shown in fig. 1, and allow said water to pass between and strike the buckets of the wheel.

A rod, $h$, attached to the upper end of each valve, extends upward through the casing, and is connected with a cross, I, or other equivalent device, by means of which said valves are simultaneously operated.

It will be readily seen that by means of this valve the water is admitted so as to strike the buckets of the wheel at the same angle, whether its volume is large or small, and also, that while giving direction to the current, it does not retard its passage, but allows it to strike said wheel in an unbroken, although divided stream.

Having thus fully set forth the nature and merits of my invention,

What I claim as new, and desire to secure by Letters Patent, is—

The combination of the buckets B B with the guides D D, substantially as and for the purpose herein shown and described.

Also, the reversing-guides D D, within the casing C, substantially as shown and for the purpose specified.

Also, the wheel A, provided with two or more sets of buckets, B B, in combination with the casing C, guides D D, and spiral valves, H H, all constructed and arranged to operate substantially as and for the purpose shown.

Also, the pivoted, adjustable, spiral valves H H, when constructed and arranged to operate substantially as shown and for the purpose specified.

In testimony that I claim the foregoing, I have hereunto set my hand, this 25th day of June, 1869.

H. A. CHADWICK.

Witnesses:
   GEO. S. PRINDLE,
   EDM. F. BROWN.